United States Patent
Ma et al.

(10) Patent No.: US 10,219,181 B2
(45) Date of Patent: Feb. 26, 2019

(54) WIRELESS DEVICE, METHOD, AND COMPUTER READABLE MEDIA FOR REQUESTING AND SENDING BLOCK ACKNOWLEDGEMENT

(71) Applicant: Intel Corporation, Santa Clara, CA (US)

(72) Inventors: Yongsen Ma, Williamsburg, VA (US); Rongzhen Yang, Shanghai (CN); Peng Meng, Shanghai (CN); Qinghua Li, San Ramon, CA (US); Huaning Niu, Milpitas, CA (US)

(73) Assignee: Intel Corporation, Santa Clara, CA (US)

( * ) Notice: Subject to any disclaimer, the term of this patent is extended or adjusted under 35 U.S.C. 154(b) by 32 days.

(21) Appl. No.: 15/507,040

(22) PCT Filed: Sep. 29, 2014

(86) PCT No.: PCT/CN2014/087766
§ 371 (c)(1),
(2) Date: Feb. 27, 2017

(87) PCT Pub. No.: WO2016/049800
PCT Pub. Date: Apr. 7, 2016

(65) Prior Publication Data
US 2017/0280358 A1  Sep. 28, 2017

(51) Int. Cl.
*H03M 13/00* (2006.01)
*H04W 28/18* (2009.01)
(Continued)

(52) U.S. Cl.
CPC ........... *H04W 28/18* (2013.01); *H04L 1/1607* (2013.01); *H04L 1/1685* (2013.01);
(Continued)

(58) Field of Classification Search
CPC .... H04W 28/18; H04L 1/1607; H04L 1/1685; H04L 1/187
See application file for complete search history.

(56) References Cited

U.S. PATENT DOCUMENTS

2009/0252143 A1  10/2009  Sridhara et al.
2010/0220678 A1*  9/2010  Wentink ............ H04W 72/1289
                                                370/329
(Continued)

FOREIGN PATENT DOCUMENTS

CN  102761356 A  10/2012
CN  107005972 A   8/2017
(Continued)

OTHER PUBLICATIONS

"Chinese Application Serial No. 201480081570.6, Voluntary Amendment filed Nov. 24, 2017", w/ claims in English, 9 pgs.
(Continued)

*Primary Examiner* — Samir W Rizk
(74) *Attorney, Agent, or Firm* — Schwegman Lundberg & Woessner, P.A.

(57) ABSTRACT

An apparatus, method, and computer readable media for requesting and sending block acknowledgement requests (BARs) and block acknowledgments (BAs) is disclosed. A method for BARs is disclosed. The method may include transmitting data frames to two or more wireless communication devices in accordance with a multi-user multiple-input and multiple-output (MU-MIMO). The method may include transmitting block acknowledgement requests (BARs) for the transmitted data frames to the two or more wireless communication devices in accordance with MU-MIMO. The method may include receiving block acknowledges (BA) of the data frames from the two or more wireless communication devices in accordance with MU-MIMO. A method for BAs is disclosed. The method may include
(Continued)

receiving data frames from a second wireless communication device. The method may include receiving a block acknowledgement request from the second wireless communication device The method may include sending a block acknowledgement to the second wireless communication device using MU-MIMO.

21 Claims, 14 Drawing Sheets

(51) Int. Cl.
*H04L 1/16* (2006.01)
*H04B 7/0452* (2017.01)
*H04L 1/00* (2006.01)
*H04L 1/18* (2006.01)
*H04L 12/807* (2013.01)

(52) U.S. Cl.
CPC .......... *H04B 7/0452* (2013.01); *H04L 1/1621* (2013.01); *H04L 1/187* (2013.01); *H04L 47/27* (2013.01); *H04L 2001/0093* (2013.01)

(56) References Cited

U.S. PATENT DOCUMENTS

| 2011/0154144 A1 | 6/2011 | Nanda |
| 2013/0201835 A1 | 8/2013 | Banerjea et al. |
| 2013/0286959 A1 | 10/2013 | Lou et al. |

FOREIGN PATENT DOCUMENTS

| EP | 2595439 A1 | 5/2013 |
| EP | 2706802 A1 | 3/2014 |
| TW | I583237 B | 5/2007 |
| TW | 201204160 A | 1/2012 |
| TW | 201625049 A | 7/2016 |
| WO | WO-2011146204 A2 | 11/2011 |
| WO | WO 2013118675 A1 | 8/2013 |
| WO | WO-2014116811 A1 | 7/2014 |

OTHER PUBLICATIONS

"European Application Serial No. 14903140.3, Extended European Search Report dated Apr. 19, 2018", 9 pgs.
"International Application Serial No. PCT/CN2014/087766, International Search Report dated Jun. 26, 2015", 4 pgs.
"International Application Serial No. PCT/CN2014/087766, Written Opinion dated Jun. 26, 2015", 7 pgs.
"Taiwanese Application serial No. 104128349 Response filed Jan. 10, 2017 to Office Action dated Jul. 11, 2016", w/ English claims and amendments, 30 pgs.
"Taiwanese Application Serial No. 104128349, Office Action dated Jul. 11, 2016", 8 pgs.
"Wireless LAN Medium Access Control (MAC) and Physical Layer (PHY) Specifications", IEEE Standard for Information Technology Telecommunications and information exchange between systems Local and metropolitan area networks—Specific requirements Part 11, (Mar. 29, 2012), 2793 pgs.

* cited by examiner

WIRELESS DEVICE, METHOD, AND COMPUTER READABLE MEDIA FOR REQUESTING AND SENDING BLOCK ACKNOWLEDGEMENT

This application is a U.S. National Stage Filing under 35 U.S.C. 371 from International Application No. PCT/CN2014/087766, filed Sep. 29, 2014 and published in English as WO 2016/049800 on Apr. 7, 2016, which is incorporated herein by reference in its entirety.

TECHNICAL FIELD

Embodiments described herein generally relate to wireless communications. Some embodiments relate to communicating block acknowledgement requests and block acknowledgments, and, in some embodiments, communicating block acknowledgement requests and block acknowledgments in multi-user (MU) multi-input and multi-output (MIMO) 802.11 communications.

BACKGROUND

Two issues with communicating data over a wireless network are requesting acknowledgements for received data and acknowledging received data. Requesting acknowledgement of received data and acknowledging received data consumes bandwidth. Moreover, with the use of some protocols a large number of stations may be transmitting concurrently in both the spatial domain and time domain. Additionally, consumers often demand more and more bandwidth for their applications.

Thus there are general needs for systems, apparatus, and methods that reduce signaling, bandwidth and delay associated with communicating requests for acknowledgements and communicating acknowledgments.

DETAILED DESCRIPTION

The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Figure 1:
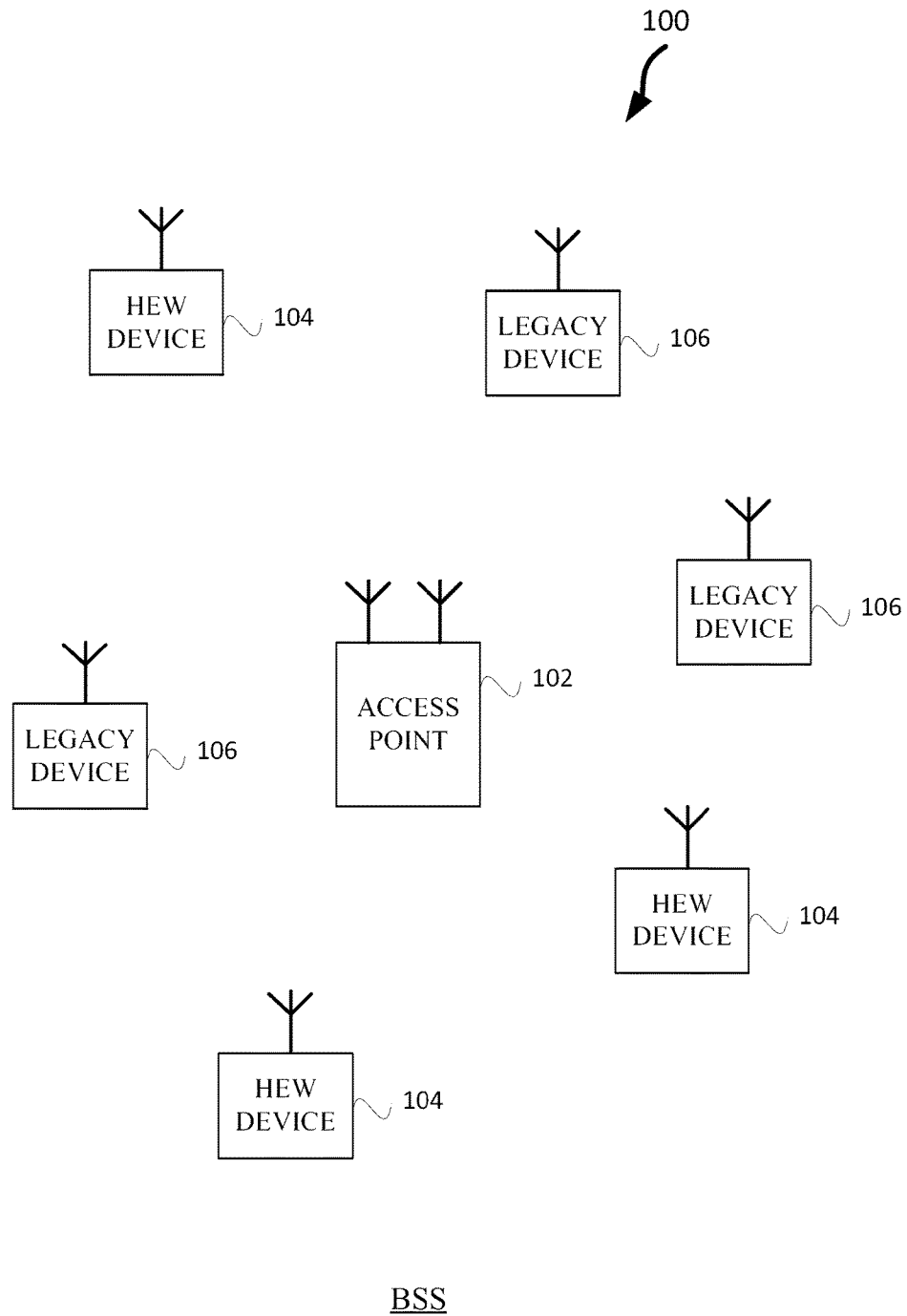
FIG. 1 illustrates a wireless network in accordance with some embodiments.

FIG. 1 illustrates a wireless network in accordance with some embodiments. The wireless network may comprise a basis service set (BSS) 100 that may include an access point (AP) 102, a plurality of HEW devices 104 and a plurality of legacy devices 106.

The AP 102 may be an access point (AP) using the Institute of Electrical and Electronics Engineers (IEEE) 802.11 to transmit and receive. The AP 102 may be a base station. The AP 102 may use other communications protocols as well as the 802.11 protocol. For example the AP 102 may use DensiFi or 802.16. The 802.11 protocol may be 802.11ax. The 802.11 protocol may include using Orthogonal Frequency-Division Multiple Access (OFDMA) and/or Space-Division Multiple Access (SDMA). The 802.11 may include using multi-user (MU) multiple-input and multiple-output (MIMO)(MU-MIMO). The HEW devices 104 may operate in accordance with 802.11ax and/or Densify. The legacy devices 106 may operate in accordance in accordance with one or more of 802.11 a/g/ag/n/ac, or another legacy wireless communication standard.

The HEW devices 104 may be wireless transmit and receive devices such as cellular telephone, handheld wireless device, wireless glasses, wireless watch, wireless personal device, tablet, or another device that may be transmitting and receiving using the 802.11 protocol such as 802.11ax or another wireless protocol.

The BSS 100 may operate on a primary channel and one or more secondary channels or sub-channels. The BSS 100 may include one or more APs 102. In accordance with embodiments, the AP 102 may communicate with one or more of the HEW devices 104 on one or more of the secondary channels or sub-channels or the primary channel. In example embodiments, the AP 102 communicates with the legacy devices 106 on the primary channel. In example embodiments, the AP 102 may be configured to communicate concurrently with one or more of the HEW devices 104 on one or more of the secondary channels and a legacy device 106 utilizing only the primary channel and not utilizing any of the secondary channels.

The AP 102 may communicate with legacy devices 106 in accordance with legacy IEEE 802.11 communication techniques. In example embodiments, the AP 102 may also be configured to communicate with HEW devices 104 in accordance with legacy IEEE 802.11 communication techniques. Legacy IEEE 802.11 communication techniques may refer to any IEEE 802.11 communication technique prior to IEEE 802.11ax.

In some embodiments, a HEW frame may be configurable to have the same bandwidth and the bandwidth may be one of 20 MHz, 40 MHz, or 80 MHz contiguous bandwidths or an 80+80 MHz (160 MHz) non-contiguous bandwidth. In some embodiments, a 320 MHz contiguous bandwidth may be used. In some embodiments, bandwidths of 1 MHz, 1.25 MHz, 2.5 MHz, 5 MHz and 10 MHz or a combination thereof may also be used. In these embodiments, an HEW frame may be configured for transmitting a number of spatial streams.

In other embodiments, the AP 102, HEW device 104, and/or legacy device 106 may implement different technologies such as CDMA2000, CDMA2000 1×, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), IEEE 802.16 (i.e., Worldwide Interoperability for Microwave Access (WiMAX)).

In an OFDMA system such as 802.11ax, an associated HEW device 104 may operate on any 20 MHz sub-channel of the BSS 100 (that can operate for example at 80 MHz).

In example embodiments, an AP 102, HEW devices 104, and legacy devices 106 use carrier sense multiple access/collision avoidance (CSMA/CA). In some embodiments, the media access control (MAC) layer 1406 (see FIG. 14) controls access to the wireless media.

In example embodiments, an AP 102, HEW devices 104, legacy devices 106, perform carrier sensing and can detect whether or not the channel is free. For example, an AP 102, HEW device 104, or legacy device 106 may use clear channel assessment (CCA) which may include a determination whether or not the channel is clear based on a Decibel-milliwatts (dBm) level of reception. In example embodiments, the physical layer (PHY) 1404 is configured to determine a CCA for an AP 102, HEW devices 104, and legacy devices 106.

After determining that the channel is free, an AP 102, HEW device 104, and legacy devices 106 defer their attempt to access the channel a back-off time to avoid collisions. In example embodiments, an AP 102, HEW device 104, and legacy devices 106 determine the back-off time by first waiting a specific amount of time and then adding a random back-off time, which, in some embodiments, is chosen uniformly between 0 and a current contention window (CS) size.

In example embodiments, an AP 102, HEW devices 104, legacy devices 106, access the channel in different ways. For example, in accordance with some IEEE 802.11ax (High-Efficiency Wi-Fi (HEW)) embodiments, an AP 102 may operate as a master station which may be arranged to contend for a wireless medium (e.g., during a contention period) to receive exclusive control of the medium for an HEW control period (i.e., a transmission opportunity (TXOP)). The AP 102 may transmit an HEW master-sync transmission at the beginning of the HEW control period. During the HEW control period, HEW devices 104 may communicate with the AP 104 in accordance with a non-contention based multiple access technique. This is unlike conventional Wi-Fi communications in which legacy devices 106 and, optionally, HEW devices 104 communicate in accordance with a contention-based communication technique, rather than a multiple access technique. During the HEW control period, the AP 102 may communicate with HEW devices 104 using one or more HEW frames. During the HEW control period, legacy devices 106 refrain from communicating. In some embodiments, the master-sync transmission may be referred to as an HEW control and schedule transmission.

In some embodiments, the multiple-access technique used during the HEW control period may be a scheduled orthogonal frequency division multiple access (OFDMA) technique, although this is not a requirement. In some embodiments, the multiple access technique may be a time-division multiple access (TDMA) technique or a frequency division multiple access (FDMA) technique. In some embodiments, the multiple access technique may be a space-division multiple access (SDMA) technique.

The AP 102 may also communicate with legacy devices 106 in accordance with legacy IEEE 802.11 communication techniques. In some embodiments, the master station may also be configured to communicate with HEW stations outside the HEW control period in accordance with legacy IEEE 802.11 communication techniques, although this is not a requirement.

Figure 5:
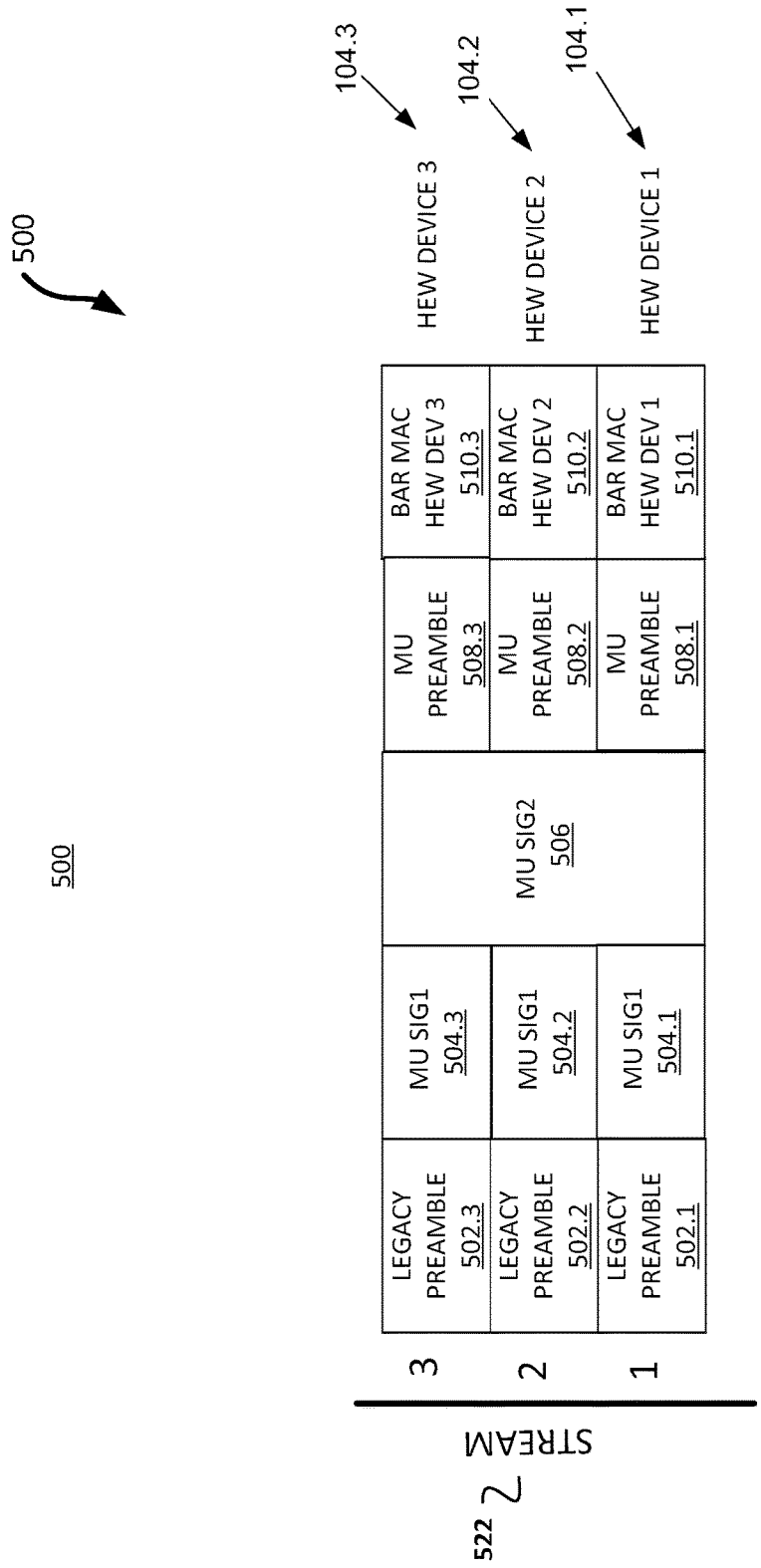
FIG. 5 illustrates a physical (PHY) frame format of MU BAR of FIG. 3 according to example embodiments.
Figure 6:
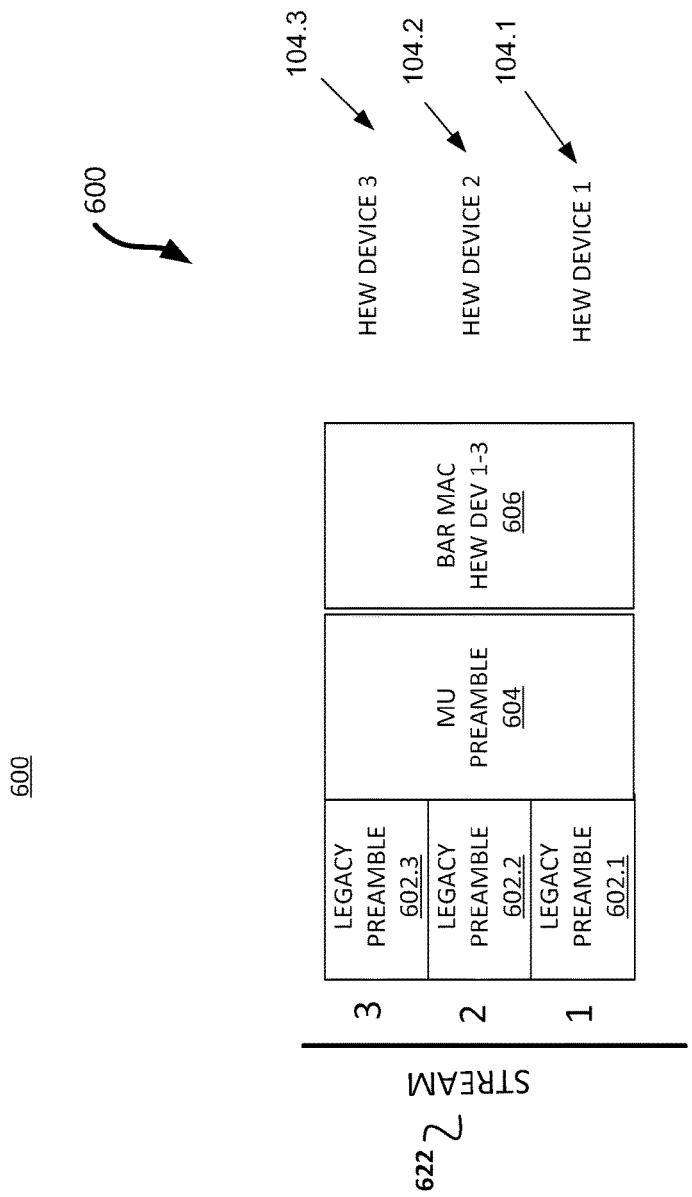
FIG. 6 illustrates a physical (PHY) frame format of MU BAR of FIG. 4 according to example embodiments.
Figure 7:
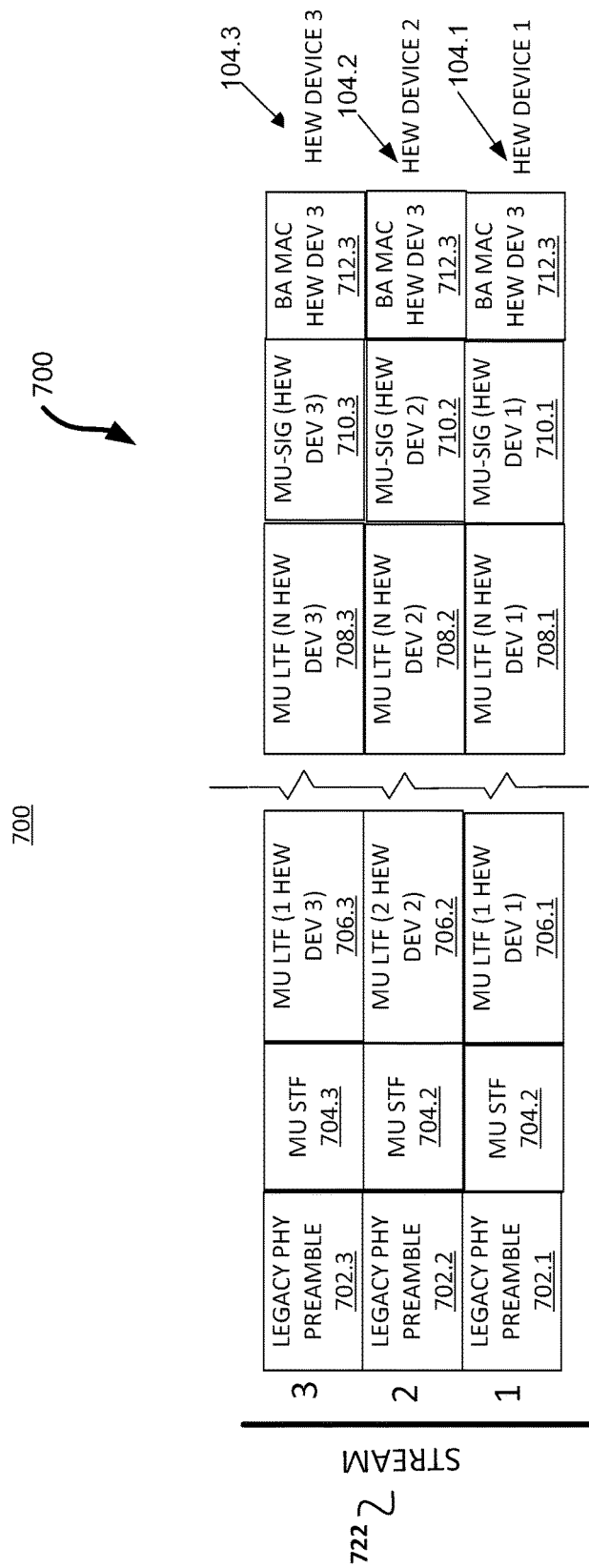
FIG. 7 illustrates a PHY frame format of a MU BA according to example embodiments.
Figure 8:
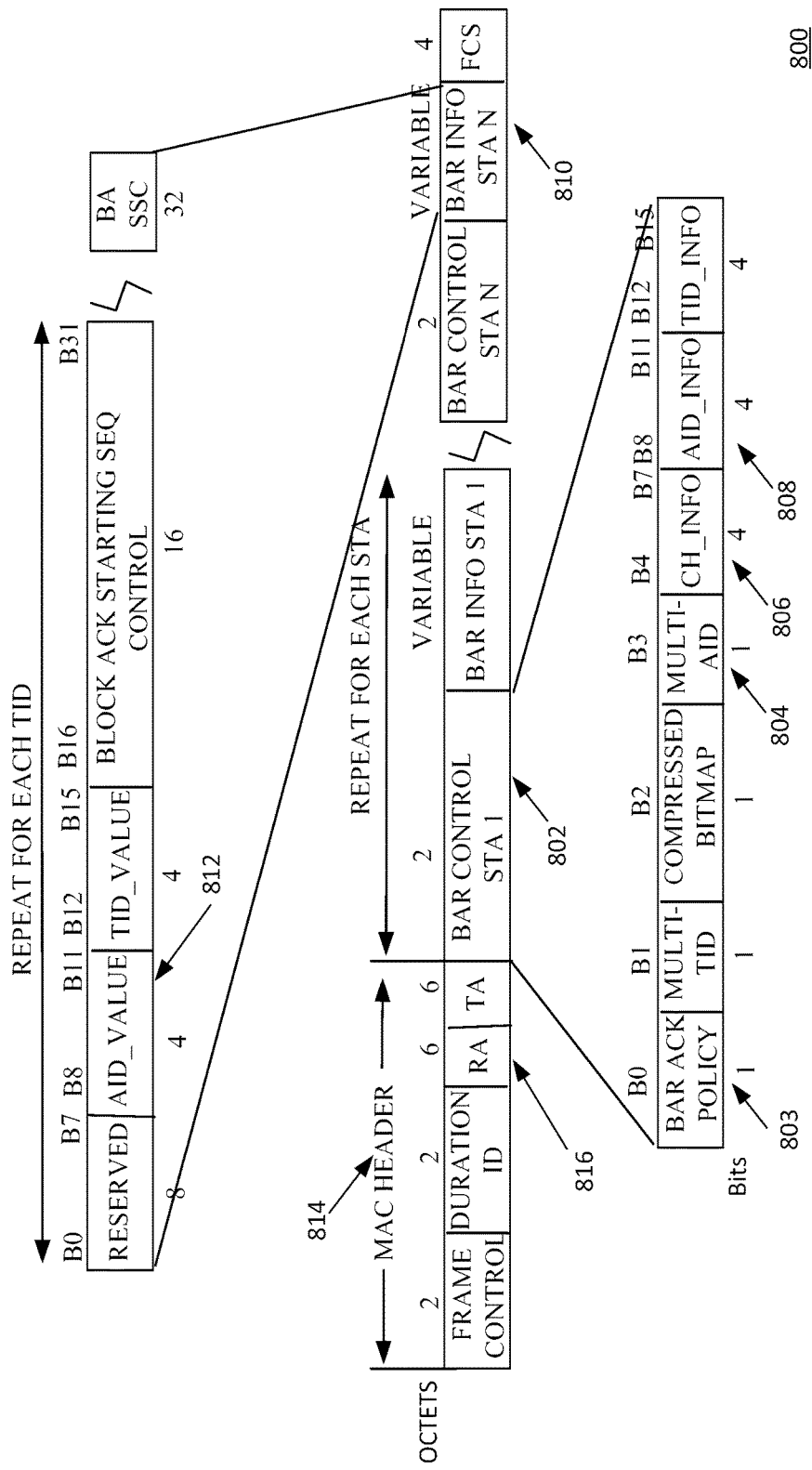
FIG. 8 illustrates a format of a MAC frame for MU BAR, according to example embodiments.
Figure 9:
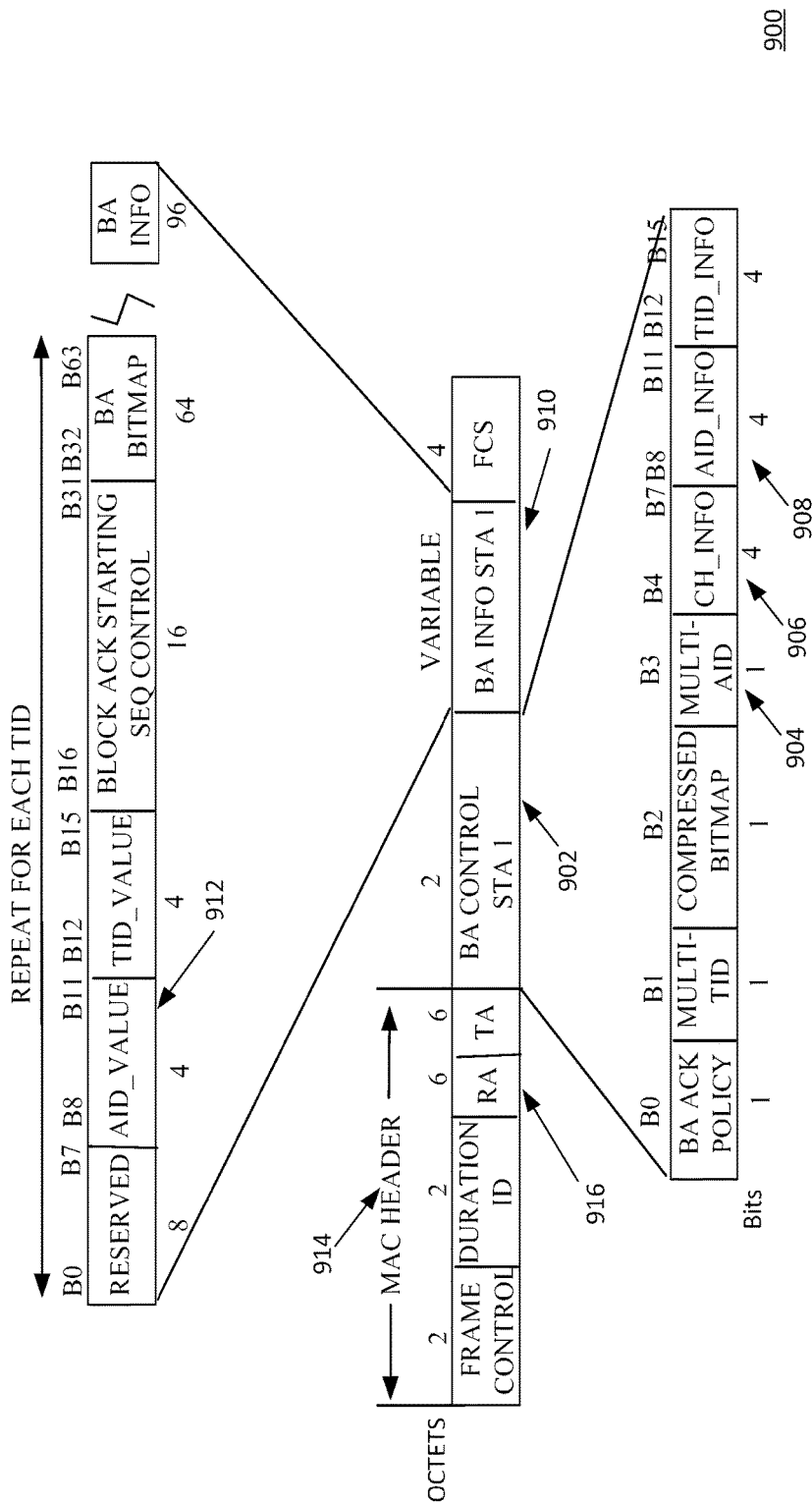
FIG. 9 illustrates a format of a MAC frame for MU BA, according to example embodiments.

In example embodiments, the HEW device 104 and/or legacy device 106 are configured to perform one or more of the functions and/or methods described herein such as concurrently transmitting block acknowledgement requests (BARs) and concurrently responding to BARs. In some embodiments, the HEW devices 104 may respond to BARs that include requests to more than one HEW device 104. In example embodiments, the AP 102 is configured to operate in accordance with one or more of the methods described in conjunction with FIGS. 2, 3, 4, 12, and 13 with the AP 102 using one or more packets as illustrated in FIGS. 5, 6, and 8. In example embodiments, the HEW device 104 is configured to operate in accordance with one or more of the methods described in conjunction with FIGS. 2, 3, 4, 12, and 13 with the AP 102 using one or more packets as illustrated in FIGS. 5, 7, and 9.

Figure 2:
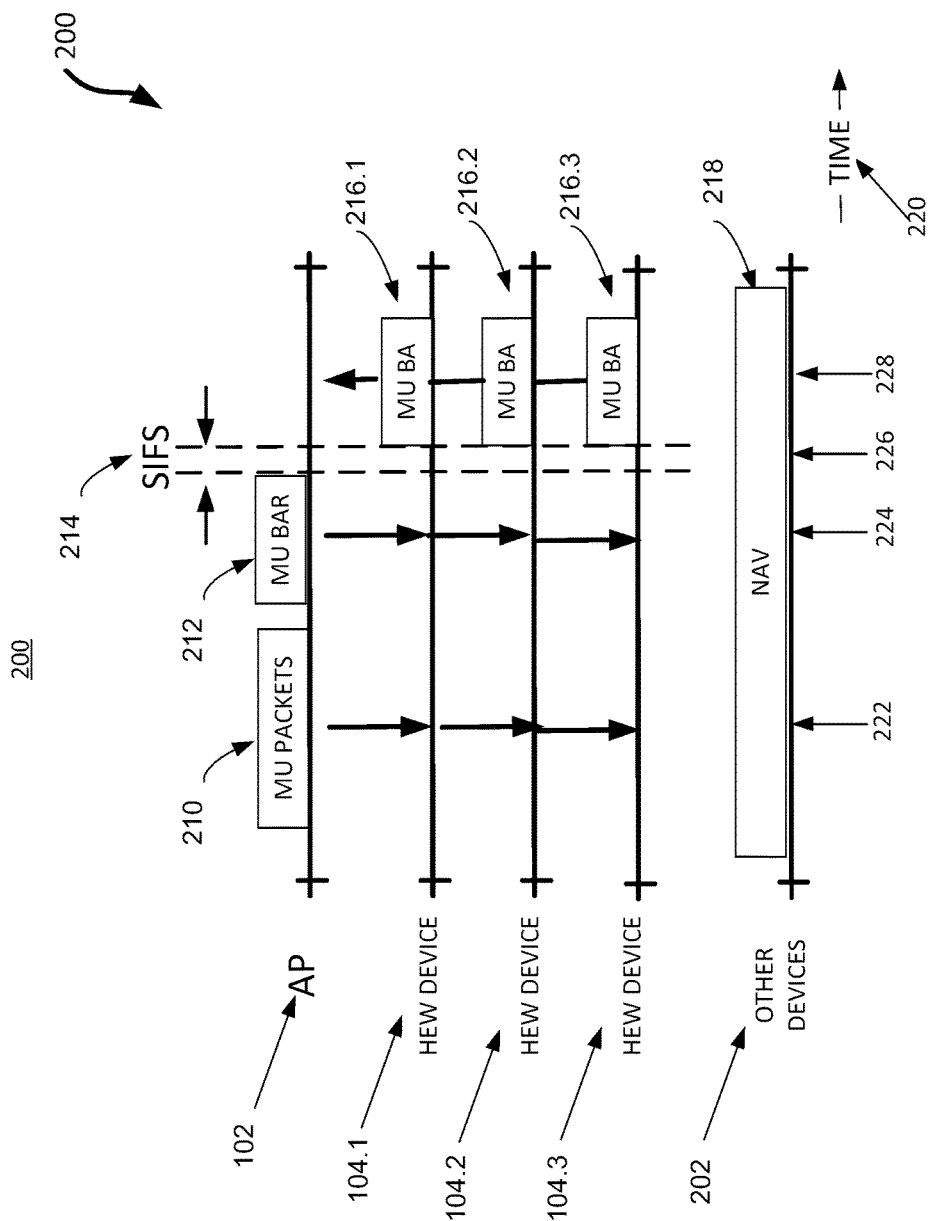
FIG. 2 illustrates a method of sending multi-user (MU) block acknowledgment (BA) in response to receiving MU block acknowledgment request (BAR) according to example embodiments.

FIG. 2 illustrates a method of sending multi-user (MU) block acknowledgment (BA) 216 in response to receiving MU block acknowledgment request (BAR) 212 according to example embodiments. Illustrated in FIG. 2 are wireless communication devices 102, 104, 202 along the vertical axis and time 220 along the horizontal axis. The method 200 begins at 222 with the AP 102 concurrently transmitting MU packets 210 to the HEW devices 104 and other devices 202. In example embodiments, the MU packets 210 are multi-user (MU) media access control (MAC) service data unit (MU-MSDU). The other devices 202 may be HEW devices 104 or legacy devices 106. The other devices 202 set a network allocation vector (NAV) 218 so as not to attempt to access the wireless medium until the NAV 218 indicates the wireless medium may be not in use. The HEW devices 104 receive the MU packets 210. The method 200 continues at 224 with the AP 102 transmitting MU BAR 212. The HEW devices 214 may receive the MU BAR 212. The method 200 continues at 226 with HEW devices 104 waiting a short inter-frame space (SIFS) 214, and continues at 228 with HEW device 104 concurrently transmitting MU BA 216 in response to the MU BAR 212. The AP 102 receives the MU BAs 216 and determines whether or not the MU packets 210 were received.

Figure 3:
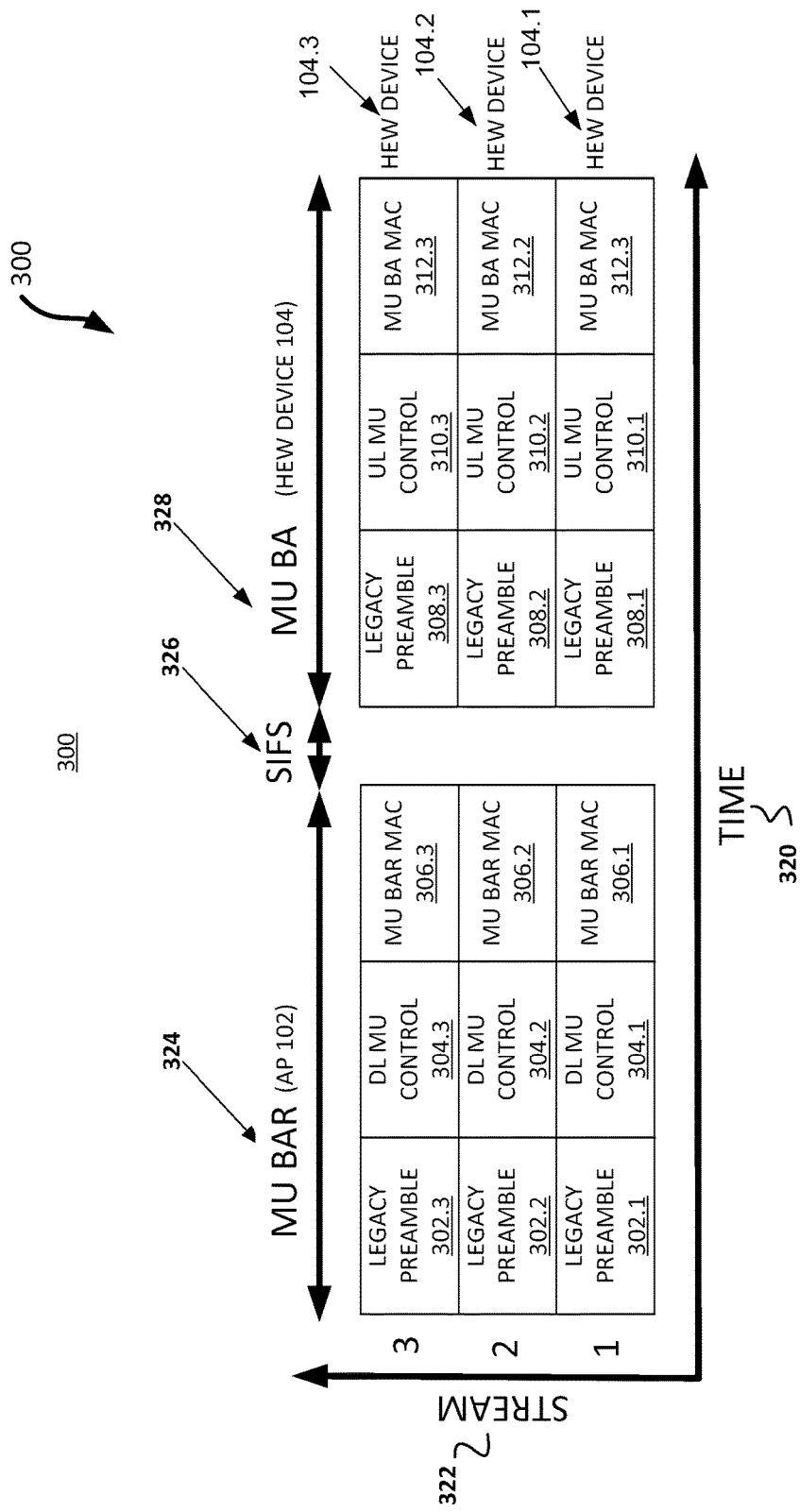
FIG. 3 illustrates a method of sending multi-user (MU) block acknowledgment (BA) in response to receiving MU block acknowledgment request (BAR) according to example embodiments.

FIG. 3 illustrates a method of sending multi-user (MU) block acknowledgment (BA) 312 in response to receiving MU block acknowledgment request (BAR) 306 according to example embodiments.

Illustrated in FIG. 3 is stream 322, which includes stream 1, stream 2, and stream 3, time 320, MU BAR 324, SIFS 326, MU BA 328, and HEW devices 104. The stream 322 may be a data stream such as a data stream in 802.11ax or Densify. The stream 322 may be transmitted on a channel such as a sub-channel in 802.11ax or Densify or a tone of OFDMA. More than one stream 322 may be transmitted on a channel using spatial streams such as spatial streams in accordance with 802.11ax, Densify, and/or SDMA.

The method 300 begins at 324 with the AP 102 transmitting MU BAR. The MU BAR 324 includes the AP 102 transmitting concurrently legacy preamble 302, down link (DL) MU control 304, and MU BAR MAC 306. The AP 102 transmits a legacy preamble 302, DL MU Control 304, and MU BAR MAC 306 to each HEW device 104.1, 104.2, 104.3. In example embodiments, the preamble includes a duration of time that indicates how long the wireless medium is reserved.

The legacy preamble 302 may be a preamble as defined in 802.11. The DL MU control 304 may be different for each of the different HEW devices 104. The MU BAR 324 may include data packets. In example embodiments data packet are transmitted prior to the MU BAR 324. The MU BAR MAC 306 may be different for each of the different HEW devices 104.

The method 300 continues at 326 with the HEW devices 104 waiting a period of time before transmitting MU BA 328. For example, the HEW devices 104 may wait a SIFS 326 period of time. Each HEW device 104 may respond to the MU BAR 324 by transmitting a legacy preamble 308, UL MU control 310, and MU BA MAC 312. The HEW devices 104 concurrently transmit the MU BA 328 on different streams 322. An allocation of the streams 322 may have been included in the MU BAR 324. The method 300 may continue with the AP 102 receiving MU BA 328 which may include legacy preamble 308, UL MU control 310, and MU BA MAC 312 from the HEW devices 104, and the AP 102 determining whether or not the data packets were received by the HEW devices 104. In example embodiments, the AP 102 may concurrently transmit acknowledge requests to legacy devices 106. The AP 102 may be configured to transmit an indication to the HEW devices 104 to transmit the BA 312 on the same sub-channel the HEW devices 104 receive the BAR 306. The AP 102 may be configured to transmit an indication to the HEW devices 104 to transmit the BA 312 immediately after a SIFS. The method 300 may end.

Figure 4:
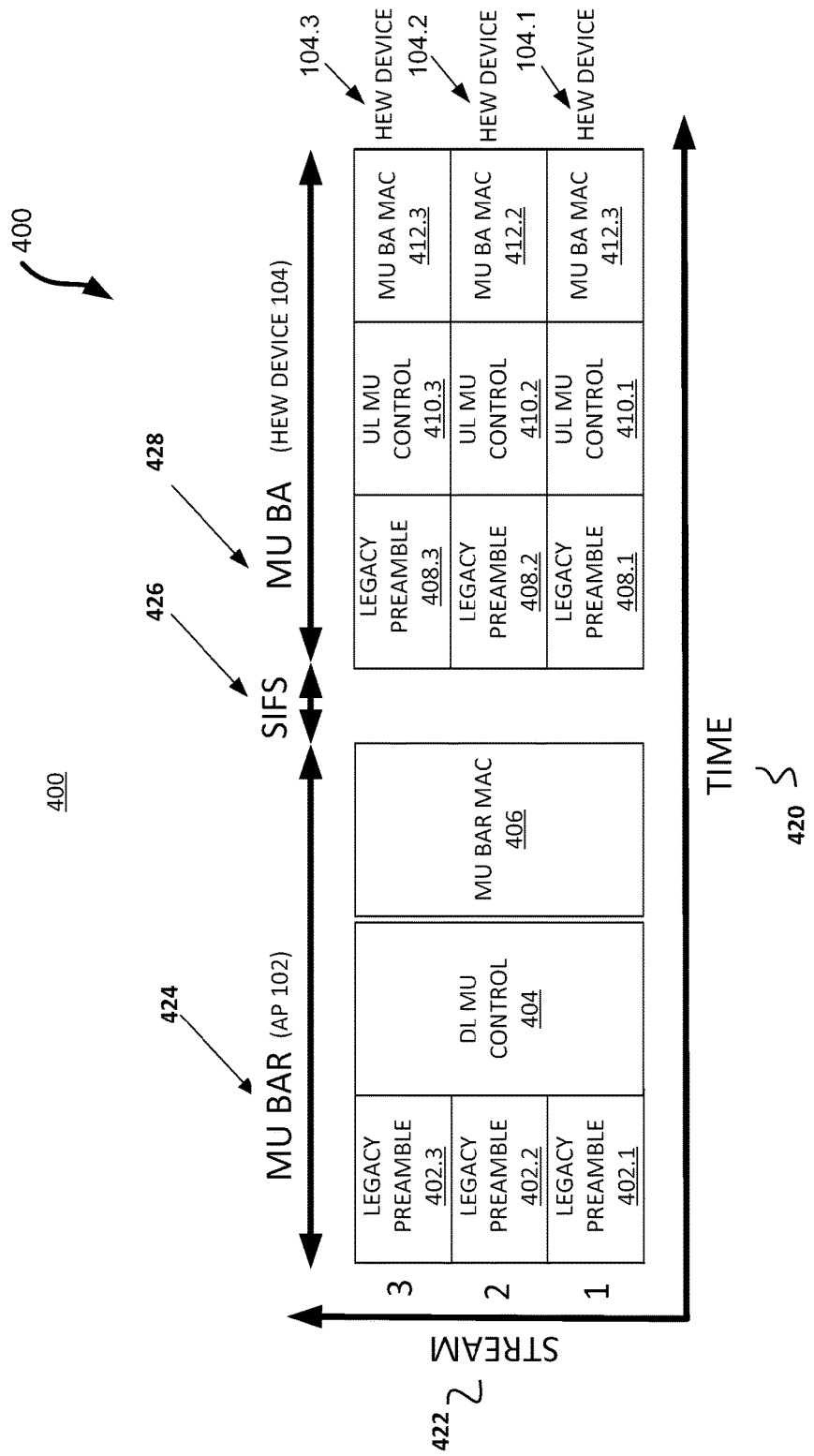
FIG. 4 illustrates a method of sending multi-user (MU) block acknowledgment (BA) in response to receiving MU block acknowledgment request (BAR) according to example embodiments.

FIG. 4 illustrates a method of sending multi-user (MU) block acknowledgment (BA) 412 in response to receiving MU block acknowledgment request (BAR) 406 according to example embodiments.

Illustrated in FIG. 4 is stream 422, which includes stream 1, stream 2, and stream 3, time 420, MU BAR 424, SIFS 426, MU BA 428, and HEW devices 104. The stream 422 may be a data stream such as a data stream in 802.11ax or Densify. The stream 422 may be transmitted on a channel such as a sub-channel in 802.11ax or Densify. More than one stream 422 may be transmitted on a channel using spatial streams such as spatial streams in accordance with 802.11ax, Densify, and/or SDMA. The MU BAR 424 may include data packets. In example embodiments data packet are transmitted prior to the MU BAR 424.

The method 400 begins with the AP 102 transmitting MU BAR 424. The MU BAR 424 includes the AP 102 transmitting concurrently legacy preamble 402, DL MU control 404, and MU BAR MAC 406. The AP 102 transmits a legacy preamble 402.3, DL MU Control 404, and MU BAR MAC 406 to HEW device 104.3, and similarly the AP 102 transmits a legacy preamble 402.2, DL MU Control 404, and MU BAR MAC 406 to HEW device 104.2, and the AP 102 transmits legacy preamble 402.1, DL MU Control 404, and MU BAR MAC 406 to HEW device 104.1.

The legacy preamble 402 may be a preamble in accordance with 802.11. The DL MU control 404 is the same for the different HEW devices 104. The MU BAR MAC 406 is the same for each of the different HEW devices 104.

The method 400 continues with the HEW devices 104 waiting a period of time before transmitting MU BA 428. For example, the HEW devices 104 may wait a SIFS period of time. The method 400 continues with each HEW device 104 responding to the MU BAR 424 by transmitting a legacy preamble 408, UL MU control 410, and MU BA MAC 412. The HEW devices 104 concurrently transmit the MU BA 428 on different streams 422. An allocation of the streams 422 may have been included in the MU BAR 424. In example embodiments, the HEW devices 104 use the stream on which they received the MU BAR MAC 406.

The AP 102 may be configured to transmit an indication to the HEW devices 104 to transmit the BA 312 on the same sub-channel the HEW devices 104 receive the BAR 406. The AP 102 may be configured to transmit an indication to the HEW devices 104 to transmit the BA 412 immediately after a SIFS.

FIG. 5 illustrates a physical (PHY) frame format of MU BAR of FIG. 3 according to example embodiments. Illustrated in FIG. 5 are legacy preamble 502, MU SIG1 504, MU SIG2 506, MU preamble 508, and BAR MAC 510.

In example embodiments, the legacy preamble 502 is reversed. In example embodiments, the information for power and timing adjustments is included in the MU preamble 508. In example embodiments, MU SIG1 504 indicates HEW device 104 specific control information. In example embodiments, MU SIG2 506 includes duplicated control information common to the HEW devices 104. In example embodiments, the BAR MAC 510 indicates the BAR MAC frame for one specific HEW device 104. For example, BAR MAC HEW DEV 3 510.3 indicates BAR MAC frame information for HEW device 3 104.3

FIG. 6 illustrates a physical (PHY) frame format of MU BAR of FIG. 4 according to example embodiments. Illustrated in FIG. 6 are streams 622, legacy preamble 602, MU preamble 604, and BAR MAC 606. In example embodiments, the legacy preamble 602 is reversed. In example embodiments, the information for power and timing adjustments is included in the MU preamble 604. In example embodiments, the BAR MAC 606 indicates the information of all the multicast grouped HEW devices 104. For example, as illustrated BAR MAC 606 indicates the information for HEW device 1 104.1, HEW device 2 104.2, and HEW device 3 104.3.

FIG. 7 illustrates a PHY frame format of a MU BA according to example embodiments. Illustrated in FIG. 7 are legacy preamble 702, MU STF 704, MU LTF 706, MU LTF 708, MU-SIG 710, and BA MAC 712. The PHY frame format 700 may be according to FIGS. 3 and 4. The BA MAC 712 of each HEW device 104 will be transmitted on different MIMO streams or OFDMA tones. The MU STF 704 is a short training frame. The MU LTF 706 is a long training frame for a HEW device 104. There may be N MU LTFs 706, 708. The MU-SIG 710 may be a signal frame. In example embodiments, the MU-SIG 710 is transmitted once for each of the HEW devices 104.

FIG. 8 illustrates a format of a MAC frame 800 for MU BAR, according to example embodiments. The MAC header 814 of the MAC frame 800 may be in accordance with 802.11 with the RA field 816 including the multicast group instead of a unicast address associated by higher level convention with a group of intended recipient HEW devices 104 that are logically related.

The BAR control field 802, which may be replicated for each STAs, is modified to support MU BA being compatible with legacy BAR frames. In example embodiments, the following three subfields are included in the BAR Control fields 802, multi-AID 804, CH_INFO 806, and AID_INFO 808. In example embodiments, multi-AID 804, CH_INFO 806, and AID_INFO 808 are encoded in reserved fields of 802.11 packet formats. The bar info STA N field 810 may include an AID_VALUE 812. The BAR Control fields 802 may include an indication of an BAR ACK policy 803 used by the AP 102.

FIG. 9 illustrates a format of a MAC frame 900 for MU BA, according to example embodiments. The MAC header 914 of the MAC frame 900 may be in accordance with 802.11 with the RA field 916 including the multicast group instead of a unicast address associated by higher level convention with a group of intended recipient HEW devices 104 that are logically related.

The BAR control field 902, which may be replicated for each STA, is modified to support MU BA being compatible with legacy BAR frames. In example embodiments, STAs are HEW devices 104. In example embodiments, three subfields are included in the BAR Control fields 902, multi-AID 904, CH_INFO 906, and AID_INFO 908. In example embodiments, multi-AID 904, CH_INFO 906, and AID_INFO 908 are encoded in reserved fields of 802.11 packet formats. An AID_VALUE 912 may be included in a BA INFO STA 1 field 910.

Example embodiments of the encoding of the BA frame 900 for multi-AID 904, CH_INFO 906, and AID_INFO 908 is indicated in Table 1 BA Frame Variant Encoding.

TABLE 1

BA Frame Variant Encoding

| Multi-AID | Multi-TID | Compressed Bitmap | BA Frame Variant |
|---|---|---|---|
| 1 | 1 | 1 | Multi-TID MU BA |
| 0 | 1 | 1 | Multi-TID BA |
| 1 | 0 | 1 | MU BA |
| 0 | 0 | 1 | Compressed BA |
| 1 | 1 | 0 | Reserved |
| 0 | 1 | 0 | Reserved |
| 1 | 0 | 0 | Reserved |
| 0 | 0 | 0 | Basic BA |

In example embodiments, when the multi-AID bit is 1, then the BAR/BA information field will repeat for each AID or STA. In example embodiments, the multi-AID indicates whether or MU BA will be used. If the multi-AID bit is 0, then non-concurrent BA will be used and bit B8 to B11 will be reserved as legacy 802.11 systems. If the multi-AID bit is 1, then MU BU will be transmitted. In example embodiments, the BA information of each STA will repeat for each TID if multi-TID is 1.

In example embodiments, CH_INFO field 906 (Table 1) includes information of spatial streams or allocated tones for each STA when the multi-AID bit is 1. In example embodiments, the CH_INFO subfield is reserved if the multi-AID bit is 0. In example embodiments, AID_INFO 908 (Table 1) is the information of AID in corresponding to each intended recipient STA.

Figure 10:
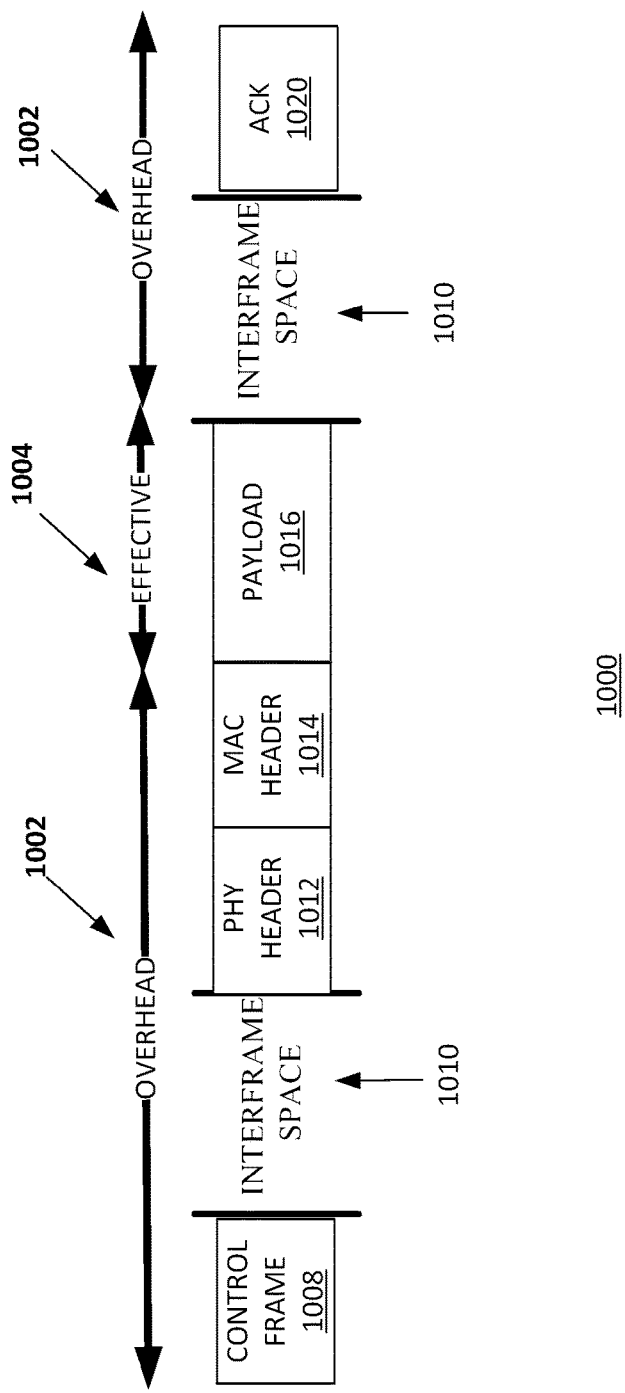
FIG. 10 illustrates payload vs. overhead in wireless communications 1000, according to example embodiments.

FIG. 10 illustrates payload vs. overhead in wireless communications 1000, according to example embodiments. Illustrated in FIG. 10 are overhead 1002, effective 1004, control frame 1008, interframe space 1010, PHY header 1012, MAC header 1014, payload 1016, and ACK 1020.

The efficiency may be determined as (sPayload*8) divided by (Time*[sum from i=1 to Number_of_Users of Rate_of_user_i]). The sPayload is the total size (in bytes) of DL MU DATA frames. NumberofUsers is the number of users. Rate_of_user_i is the maximum data rate of user i corresponding to the chosen MCS (modulation and coding scheme). Time is the transmission time of a download period including control frame 1008, interspace 1010, PHY header 1012, MAC header 1014, payload (data) 1016, and ACK 1020. Example frame lengths are illustrated in Table 2.

TABLE 2

| Parameter Settings | |
|---|---|
| Frames | Size (Bytes) |
| BAR | 26 |
| BA | 34 |
| ACK | 14 |
| MU BAR | 26 + number_of_Users * 4 |
| MU BA | 34 + number_of_Users * 12 |
| PHY header | 24 |
| MAC header | 40 |
| MPDU (max) | 11,454 |

Figure 11:
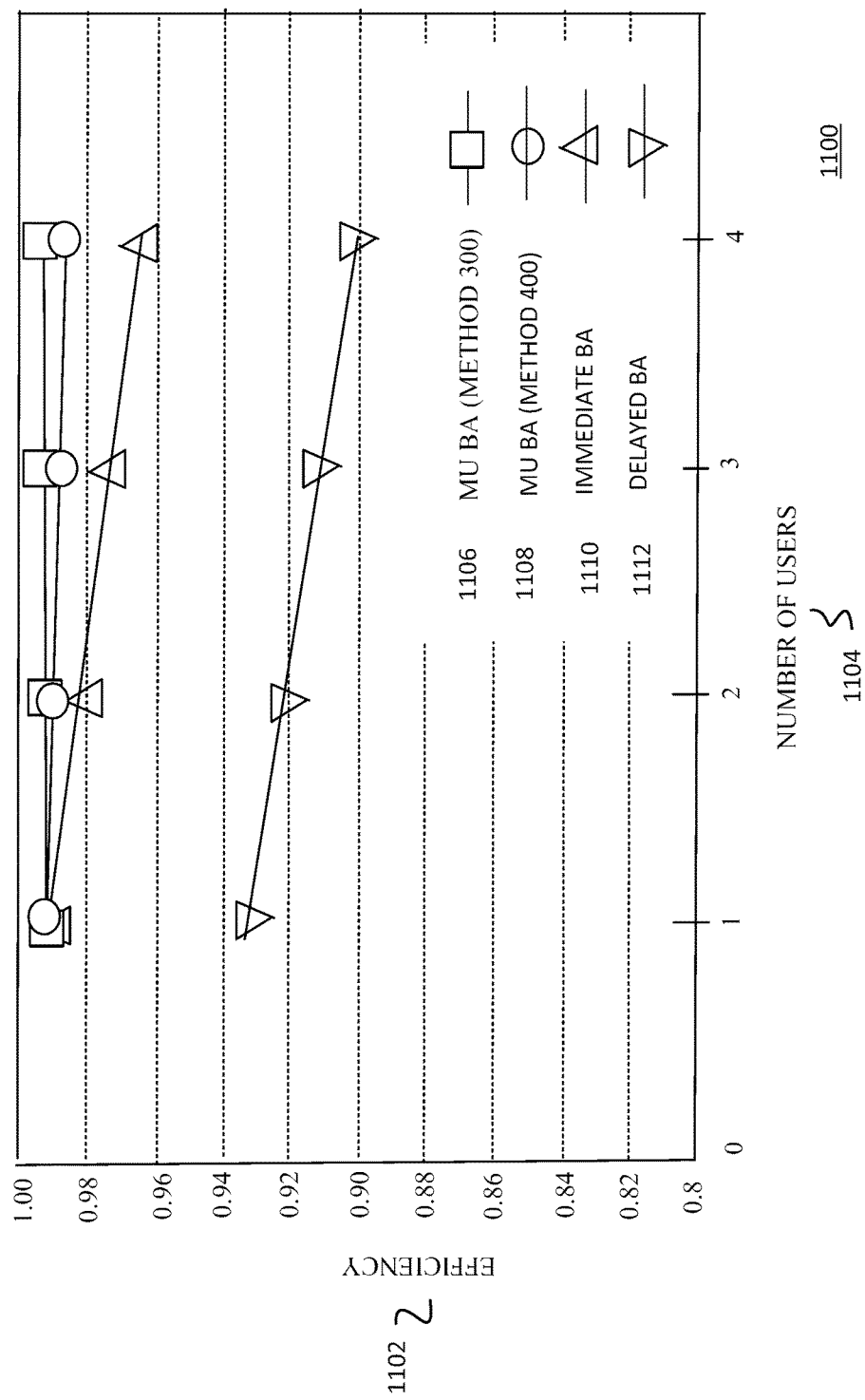
FIG. 11 illustrates a graph comparing the efficiency of different block acknowledgement methods for download MU.

FIG. 11 illustrates a graph 1100 comparing the efficiency 1102 of different block acknowledgement methods for download MU. Along the vertical axis is efficiency 1102 and along the horizontal axis is a number of users 1104 or STAs, which may be HEW devices 104. The graph illustrates that example embodiments of MU BA as disclosed herein can improve the efficiency of wireless communications.

Illustrated on the chart 1100 are MU BA 1106 according to method 300 (method 1300), MU BA 1108 according to method 400 (or method 1300), immediate BA 1110, and delayed BA 1112 Immediate BA 1110 is according to legacy 802.11 where the BA's from the STA are sequentially sent to the AP 102 rather than concurrently. Delayed BA 1112 is according to legacy 802.11 where the BA's from the STA are sequentially sent to the AP 102 after the AP 102 is finished sending the BARs to all the STAs.

When number of users 1104 is 1, MU BA 1106 and MU BA 1108 perform about the same as immediate BA 1110. The delayed BA 1112 is about 6 percent lower due to extra ACK exchanges and more inter-frame spaces. For mult-user transmissions, MU BA 1106 and MU BA 1108 can improve the MAC efficiency 1102 compared to both immediate BA 1110 and delayed BA 1112. When the number of users (STAs) is 4, MU BA 1106 and MU BA 1108 have an efficiency improvement of 9% compared with delayed BA 1112 and about 2.5% compared with immediate BA 1110. Thus, MU BA 1106 and MU BA 1108 provide greater efficiency of the communication medium than existing methods immediate BA 1110 and delayed BA 1112.

Figure 12:
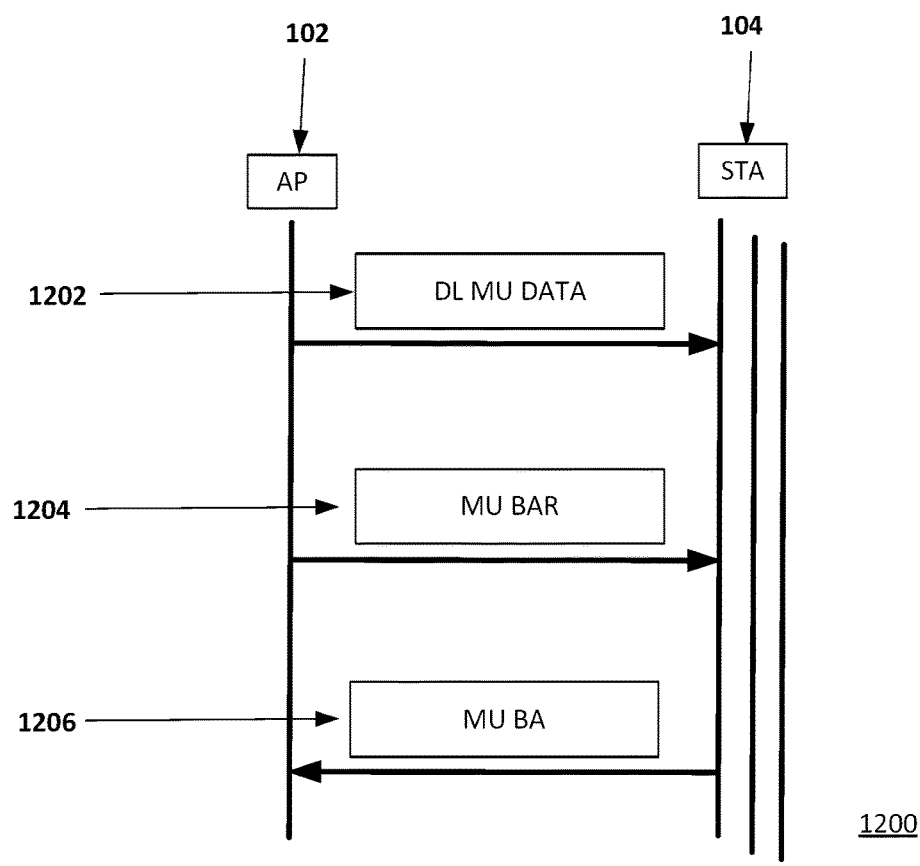
FIGS. 12 illustrates a method for BAR and BA according to example embodiments.

FIG. 12 illustrates a method for BAR and BA according to example embodiments. FIG. 12 illustrates AP 102 and STA 104. The STA 104 may be one or more HEW devices 104 as illustrated in FIG. 1. The method 1200 may begin at 1202 with the AP 102 sending DL MU data. The method 1200 continues at 1204 with the AP 102 sending MU BARs to the STAs 104. For example, 306 (FIGS. 3) and 406 (FIG. 4) illustrate MU BARs being sent to STAs (HEW devices 104).

The method 1200 continues at 1206 with MU BAs sent from the STAs 104 to the AP 102. For example, 312 (FIGS.

3), and 412 (FIG. 4) illustrate MU BAs being sent from STAs (HEWs 104) to an AP 102. The method 1200 may end.

Figure 13:
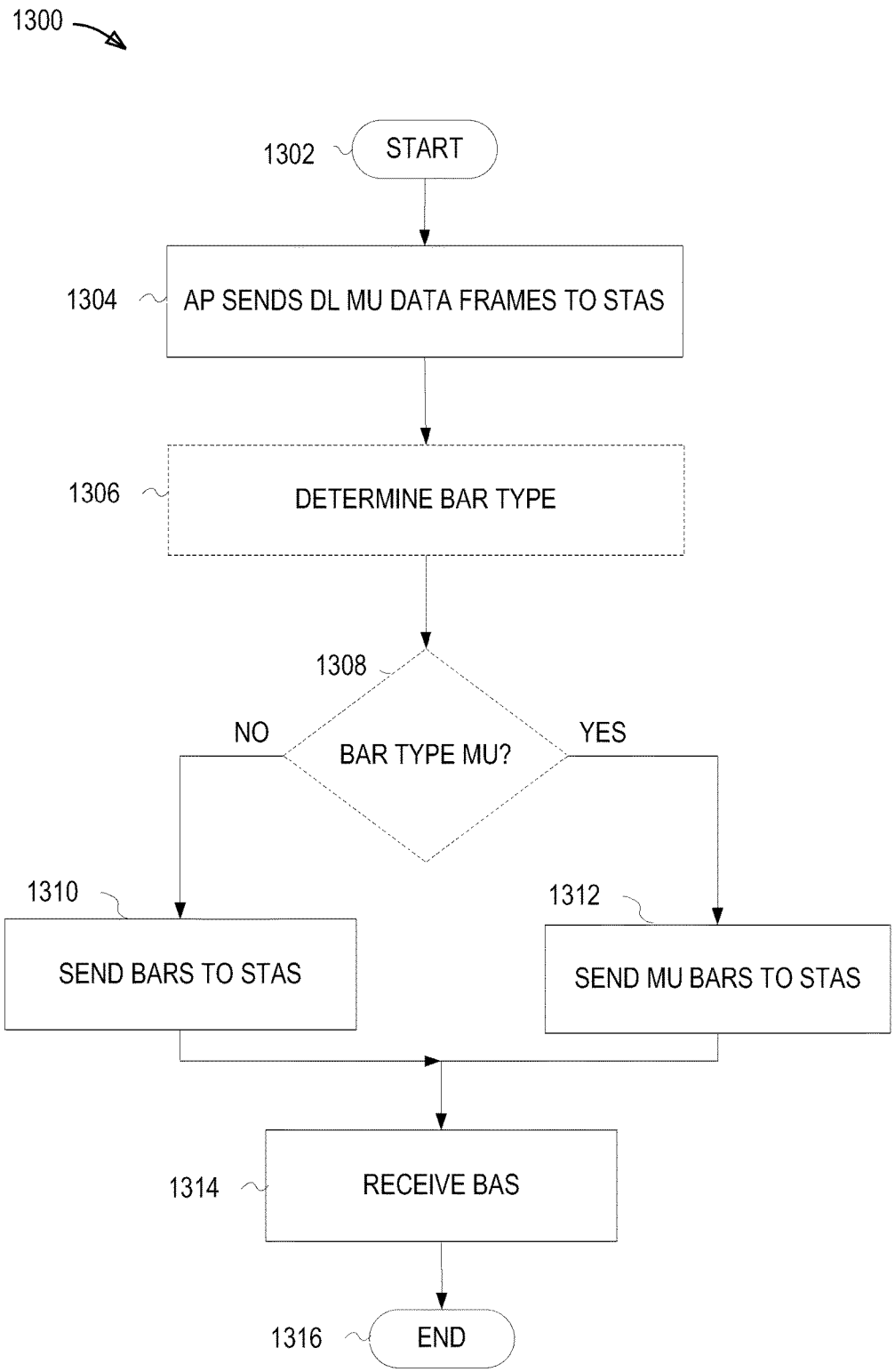
FIG. 13 illustrates a method for BARs and BAs according to example embodiments.

FIG. 13 illustrates a method 1300 for BARs and BAs according to example embodiments. The method 1300 begins with start 1302. The method 1300 continues at 1304 with AP sending DL MU data frames to STAs. For example, the AP 102 in FIG. 12 may send DL MU DATA to STAs 104. In FIG. 2, the AP 102 sends MU packets 210, which may be data, to HEW devices 104.

The method 1300 continues at 1306 with determining BAR type. For example, the AP 102 may determine whether or not to set multi-AID bit to 0 to send BARs separately to each STA, or to set multi-AID bit to 1 to send MU BAR collectively. In example embodiments, the AP 102 may be configured to send the BAR a specific way and sets the appropriate bit(s) to indicate the type of BAR. In example embodiments, an 802.11 standard supports only MU BAR or sending BARs separately, and the AP 102 does not determine which BAR type.

The method 1300 continues at 1308 with BAR type MU. In example embodiments, 1308 is optional, for example, when there are not multiple types of BARs supported by the AP 102.

If the BAR type is not MU, then the method 1300 continues at 1310 with sending BARs to STAs. For example, the AP 102 may send MU BAR 306 to each HEW device 104 (FIG. 3) with an example frame 500 (FIG. 5). In another example, the AP 102 sends MU BAR 1004 to STAs 104. In example embodiments, information for power and timing adjustment are included in a PHY header.

If the bar type is MU, then the method 1300 may continue at 1312 with sending MU bars to the STAs. For example, the AP 102 sends one frame MU BAR 406 (FIG. 4) to multiple HEW devices 104 with an example frame 600 (FIG. 6). As another example, the AP 102 sends MU BAR 1204 (FIG. 12). In example embodiments, information for power and timing adjustment are included in a PHY header.

The method 1300 continues at 1314 with receive BAs. For example, 312 (FIGS. 3), and 412 (FIG. 4) illustrate MU BAs being sent from STAs (HEWs 104) to an AP 102. The method 1300 may end at 1316.

Figure 14:
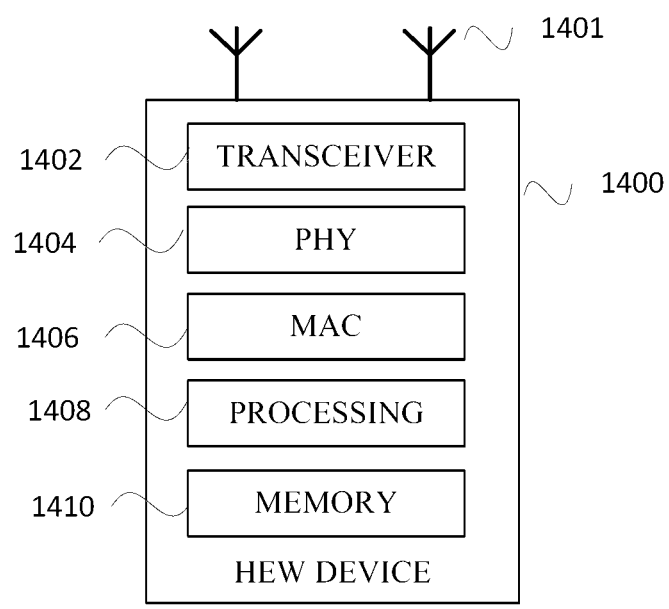
FIG. 14 illustrates a HEW device in accordance with some embodiments.

FIG. 14 illustrates a HEW device in accordance with some embodiments. HEW device 1400 may be an HEW compliant device that may be arranged to communicate with one or more other HEW devices, such as HEW devices 104 (FIG. 1) or access point 102 (FIG. 1) as well as communicate with legacy devices 106 (FIG. 1). HEW devices 104 and legacy devices 106 may also be referred to as HEW stations (STAs) and legacy STAs, respectively. HEW device 1400 may be suitable for operating as access point 102 (FIG. 1) or an HEW device 104 (FIG. 1). In accordance with embodiments, HEW device 1400 may include, among other things, a transmit/receive element (for example an antenna), a transceiver 1402, physical layer (PHY) circuitry 1404 and medium-access control layer circuitry (MAC) 1406. PHY 1404 and MAC 1406 may be HEW compliant layers and may also be compliant with one or more legacy IEEE 802.11 standards. MAC 1406 may be arranged to configure PPDUs and arranged to transmit and receive PPDUs, among other things. HEW device 1400 may also include other processing circuitry 1408 and memory 1410 may be configured to perform the various operations described herein. In example embodiments, the processing circuitry 1408 is hardware circuitry 1408. The processing circuitry 1408 may be coupled to the transceiver 1402, which may be coupled to the transmit/receive element 1401. While FIG. 14 depicts the processing circuitry 1408 and the transceiver 1402 as separate components, the processing circuitry 1408 and the transceiver 1402 may be integrated together in an electronic package or chip.

In some embodiments, the MAC 1406 may be arranged to contend for a wireless medium during a contention period to receive control of the medium for the HEW control period and configure an HEW PPDU. In some embodiments, the MAC 1406 may be arranged to contend for the wireless medium based on channel contention settings, a transmitting power level, and a CCA level.

The PHY 1404 may be arranged to transmit the HEW PPDU. The PHY 704 may include circuitry for modulation/demodulation, upconversion/downconversion, filtering, amplification, etc. In some embodiments, the processing circuitry 1408 may include one or more processors. The processing circuitry 1408 may be configured to perform functions based on instructions being stored in a RAM or ROM, or based on special purpose circuitry. In some embodiments, the processing circuitry 1408 may be configured to perform one or more of the functions described herein for sending and receiving BARs and BAs.

In some embodiments, two or more antennas may be coupled to the PHY 1404 and arranged for sending and receiving signals including transmission of the HEW packets. The HEW device 1400 may include a transceiver to transmit and receive data such as HEW PPDU and packets that include an indication that the HEW device 1400 should adapt the channel contention settings according to settings included in the packet. The memory 1408 may be store information for configuring the other circuitry to perform operations for configuring and transmitting BAR and BA packets and performing the various operations described herein including sending and responding to BARs and BAs.

In some embodiments, the HEW device 1400 may be configured to communicate using OFDM communication signals over a multicarrier communication channel. In some embodiments, HEW device 1400 may be configured to communicate in accordance with one or more specific communication standards, such as the Institute of Electrical and Electronics Engineers (IEEE) standards including IEEE 802.11-2012, 802.11n-2009, 802.11ac-2013, 802.11ax, DensiFi, standards and/or proposed specifications for WLANs, although the scope of the example embodiments is not limited in this respect as they may also be suitable to transmit and/or receive communications in accordance with other techniques and standards. In some embodiments, the HEW device 1400 may use 4× symbol duration of 802.11n or 802.11ac.

In some embodiments, a HEW device 1400 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), an access point, a base station, a transmit/receive device for a wireless standard such as 802.11 or 802.16, or other device that may receive and/or transmit information wirelessly. In some embodiments, the mobile device may include one or more of a keyboard, a display, a non-volatile memory port, multiple antennas, a graphics processor, an application processor, speakers, and other mobile device elements. The display may be an LCD screen including a touch screen.

The transmit/receive element 1401 may comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result.

Although the device 1400 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements.

Example embodiments have the technical effect of increasing the efficiency of the wireless medium as disclosed in conjunction with FIG. 11. The HEW device 104 thus, may increase both the throughput of the HEW device 104, and the throughput of other HEW devices 104 and/or legacy devices 106.

Embodiments may be implemented in one or a combination of hardware, firmware and software. Embodiments may also be implemented as instructions stored on a computer-readable storage device, which may be read and executed by at least one processor to perform the operations described herein. A computer-readable storage device may include any non-transitory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. Some embodiments may include one or more processors and may be configured with instructions stored on a computer-readable storage device.

The following examples pertain to further embodiments. Example 1 is a wireless communication device. The wireless communication device including processing circuitry to: transmit data frames to two or more wireless communication devices in accordance with down link (DL) multi-user multiple input and multiple output (MU-MIMO); transmit block acknowledgement requests (BARs) for the transmitted data frames to the two or more wireless communication devices in accordance with DL MU-MIMO; and receive block acknowledgements (BA) of the data frames from the two or more wireless communication devices in accordance with uplink (UL) MU-MIMO.

In Example 2, the subject matter of Example 1 can optionally include where the processing circuitry is further to: transmit the data frames in accordance with 802.11ax or Densify, and in accordance with orthogonal frequency division multiple access (OFDMA).

In Example 3, the subject matter of Examples 1 and 2 can optionally include where the BARs are included in a packet to be sent to each of the two or more wireless communication devices.

In Example 4, the subject matter of Examples 1 through 3 can optionally include where the BARs are each to be sent in separate packets to each of the two or more wireless communication devices.

In Example 5, the subject matter of Examples 1 through 4 can optionally include where the wireless communication device is an access point.

In Example 6, the subject matter of Examples 1 through 5 can optionally include where the processing circuitry is further to: transmit a legacy preamble that comprises an indication of a duration of time to reserve a wireless medium, wherein the duration of time includes at least a time for the to two or more wireless communication devices to transmit the BAs of the data frames.

In Example 7, the subject matter of Examples 1 through 6 can optionally include where the BAR comprises an indication of which sub-channel each of the two or more wireless communications devices should use to transmit the BAs of the data frames.

In Example 8, the subject matter of Examples 1 through 7 can optionally include where the processing circuitry is further to: transmit a BAR preamble to each of the two or more wireless communication devices in accordance with DL MU-MIMO.

In Example 9, the subject matter of Examples 1 through 8 can optionally include where the processing circuitry is further to: transmit a different MU BAR preamble to each of the two or more wireless communication devices in accordance with DL MU-MIMO.

In Example 10, the subject matter of Examples 1 through 9 can optionally include where the processing circuitry is further to: transmit an indication to each of the two or more wireless communication devices to transmit the BA on the same subchannel the two or more wireless communication devices are to receive the BAR.

In Example 11, the subject matter of Examples 1 through 10 can optionally include where the processing circuitry is further to: transmit an indication to each of the two or more wireless communication devices to transmit the BA after waiting a Short Inter-Frame Space (SIFS).

In Example 12, the subject matter of Examples 1 through 11 can optionally include a memory and at least one radio.

In Example 13, the subject matter of Example 12 can optionally include at least one antenna.

Example 14 is a method on a wireless communication device. The method includes transmitting data frames to two or more wireless communication devices in accordance with down link (DL) multi-user multiple input and multiple output (MU-MIMO) and orthogonal frequency division multiple access (OFDMA); transmitting block acknowledgement requests (BARs) for the transmitted data frames to the two or more wireless communication devices in accordance with DL MU-MIMO and OFDMA; and receiving block acknowledges (BA) of the data frames from the two or more wireless communication devices in accordance with uplink (UL) MU-MIMO and OFDMA.

In Example 15, the subject matter of Example 14 can optionally include transmitting the data frames in accordance with at least one from the following group: 802.11ax and Densify, and wherein the wireless communication device is an access point.

In Example 16, the subject matter of Examples 14 and 15 can optionally include where the BARs are included in a packet sent to each of the two or more wireless communication devices.

In Example 17, the subject matter of Examples 14 and 15 can optionally include where the BARs are each sent in separate packets to the two or more wireless communication devices.

Example 18 is a first wireless communications device. The first wireless communication device includes processing circuitry to: receive data frames from a second wireless communication device in accordance with down-link (DL) MU-MIMO and orthogonal frequency division multiple access (OFDMA); receive a block acknowledgement request (BAR) for the received data frames from the second wireless communication device in accordance with DL MU-MIMO and OFDMA; and in response to the received BAR, transmit a block acknowledgement (BA) to the second wireless communication device in accordance with up-link (UL) MU-MIMO and OFDMA.

In Example 19, the subject matter of Example 18 can optionally include where the BAR comprises a BAR for the first wireless communication device and for at least one other wireless communication device.

In Example 20, the subject matter of Examples 18 and 19 can optionally include where the processing circuitry is further to: receive an indication of a subchannel to transmit the BA on; and transmit the BA on the indicated subchannel.

In Example 21, the subject matter of Examples 18 through 20 can optionally include where the processing circuitry is further to: transmit the BA following a Short Inter-Frame Space (SIFS); and wherein the first wireless communication device operates in accordance with at least one from the following group: 802.11ax and Densify.

In Example 22, the subject matter of Examples 18 through 21 can optionally include a memory and at least one radio.

In Example 23, the subject matter of Example 22 can optionally include at least one antenna.

In Example 24 a non-transitory computer-readable storage medium that stores instructions for execution by one or more processors to perform operations for block acknowledgement (BAs) is disclosed. The instructions include transmitting data frames to two or more wireless communication devices in accordance with down link (DL) multi-user multiple input and multiple output (MU-MIMO) and orthogonal frequency division multiple access (OFDMA); transmitting block acknowledgement requests (BARs) for the transmitted data frames to the two or more wireless communication devices in accordance with DL MU-MIMO and OFDMA; and receiving block acknowledges (BA) of the data frames from the two or more wireless communication devices in accordance with uplink (UL) MU-MIMO and OFDMA.

In Example 25, the subject matter of Example 24 can optionally include where the BARs are included in a packet sent to each of the two or more wireless communication devices.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. An apparatus of a wireless communication device, the apparatus comprising: memory; and processing circuitry coupled to the memory, the processing circuitry configured to:
    encode a physical layer convergence protocol (PLCP) protocol data unit (PPDU) for block acknowledgement requests (BARs), the PPDU for BARs comprising data frames for two or more wireless communication devices, the data frames to be transmitted in accordance with one or both of down link (DL) multi-user multiple input and multiple output (MU-MIMO) and orthogonal frequency division multiple access (OFDMA), the PPDU for BARs further comprising an indication of which sub-channel each of the two or more wireless communications devices should use to transmit block acknowledgements (BAs) to the data frames;
    generate signaling to cause the wireless communication device to transmit the PPDU for BARs to the two or more wireless communication devices in accordance with one or both of MU-MIMO and DL OFDMA; and
    decode block acknowledgements (BA) of the data frames from the two or more wireless communication devices in accordance with the sub-channel each of the two or more wireless communications devices should use and one or both of uplink (UL) MU-MIMO and OFDMA.

2. The wireless communication device of claim 1, wherein the BARs are included in a packet to be sent to each of the two or more wireless communication devices.

3. The wireless communication device of claim 1, wherein the BARs are each to be sent in separate packets to each of the two or more wireless communication devices.

4. The wireless communication device of claim 1, wherein the wireless communication device is an access point.

5. The wireless communication device of claim 1, wherein the processing circuitry is further to:
    transmit a legacy preamble that comprises an indication of a duration of time to reserve a wireless medium, wherein the duration of time includes at least a time for the to two or more wireless communication devices to transmit the BAs of the data frames.

6. The wireless communication device of claim 1, wherein the processing circuitry is further to:
    transmit a BAR preamble to each of the two or more wireless communication devices in accordance with DL MU-MIMO.

7. The wireless communication device of claim 1, wherein the processing circuitry is further to:
    transmit a different MU BAR preamble to each of the two or more wireless communication devices in accordance with DL MU-MIMO.

8. The wireless communication device of claim 1, wherein the processing circuitry is further to:
    transmit an indication to each of the two or more wireless communication devices to transmit the BA on the same subchannel the two or more wireless communication devices are to receive the BAR.

9. The wireless communication device of claim 1, wherein the processing circuitry is further to:
    transmit an indication to each of the two or more wireless communication devices to transmit the BA after waiting a Short Inter-Frame Space (SIFS).

10. The wireless communication device of claim 1, further comprising a memory and at least one radio.

11. The wireless communication device of claim 10, further including at least one antenna.

12. A method on a wireless communication device, the method comprising:
    encoding a physical layer convergence protocol (PLCP) protocol data unit (PPDU) for block acknowledgement requests (BARs), the PPDU for BARs comprising data frames for two or more wireless communication devices, the data frames to be transmitted in accordance with one or both of down link (DL) multi-user multiple input and multiple output (MU-MIMO) and orthogonal frequency division multiple access (OFDMA), the PPDU for BARs further comprising an indication of which sub-channel each of the two or more wireless communications devices should use to transmit block acknowledgements (BAs) to the data frames;

generating signaling to cause the wireless communication device to transmit the PPDU for BARs to the two or more wireless communication devices in accordance with one or both of MU-MIMO and DL OFDMA; and decoding block acknowledgements (BA) of the data frames from the two or more wireless communication devices in accordance with the sub-channel each of the two or more wireless communications devices should use and one or both of uplink (UL) MU-MIMO and OFDMA.

13. The method of claim 12, wherein the BARs are included in a packet sent to each of the two or more wireless communication devices.

14. The method of claim 12, wherein the BARs are each sent in separate packets to the two or more wireless communication devices.

15. A first wireless communication device, the first wireless communication device comprising processing circuitry to:

decode a physical layer convergence protocol (PLCP) protocol data unit (PPDU) for block acknowledgement requests (BARs), the PPDU for BARs comprising data frames from a second wireless communication device, wherein the data frame are received in accordance with down-link (DL) MU-MIMO and orthogonal frequency division multiple access (OFDMA);

the PPDU for BARs further comprising a block acknowledgement request (BAR), the BAR comprising an indication of a sub-channel for the first wireless communication device to transmit a block acknowledgement (BA) of the received data frames to the second wireless communication device; and in response to the received BAR, transmit the BA to the second wireless communication device in accordance with up-link (UL) MU-MIMO and OFDMA.

16. The first wireless communication device of claim 15, wherein the BAR comprises a BAR for the first wireless communication device and for at least one other wireless communication device.

17. The first wireless communication device of claim 15, wherein the processing circuitry is further to:

transmit the BA following a Short Inter-Frame Space (SIFS); and wherein the first wireless communication device operates in accordance with at least one from the following group: 802.11ax and Densify.

18. The first wireless communication device of claim 15, further comprising a memory and at least one radio.

19. The wireless communication device of claim 18, further including at least one antenna.

20. A non-transitory computer-readable storage medium that stores instructions for execution by one or more processors to perform operations for block acknowledgement (BAs), the instructions comprising:

encoding a physical layer convergence protocol (PLCP) protocol data unit (PPDU) for block acknowledgement requests (BARs), the PPDU for BARs comprising data frames for two or more wireless communication devices, the data frames to be transmitted in accordance with one or both of down link (DL) multi-user multiple input and multiple output (MU-MIMO) and orthogonal frequency division multiple access (OFDMA), the PPDU for BARs further comprising an indication of which sub-channel each of the two or more wireless communications devices should use to transmit block acknowledgements (BAs) to the data frames;

generating signaling to cause the wireless communication device to transmit the PPDU for BARs, to the two or more wireless communication devices in accordance with one or both of MU-MIMO and DL OFDMA; and decoding block acknowledgements (BA) of the data frames from the two or more wireless communication devices in accordance with the sub-channel each of the two or more wireless communications devices should use and one or both of uplink (UL) MU-MIMO and OFDMA.

21. The non-transitory computer-readable storage medium of claim 20, wherein the BARs are included in a packet sent to each of the two or more wireless communication devices.

* * * * *